United States Patent [19]

Mauller

[11] Patent Number: 4,972,821
[45] Date of Patent: Nov. 27, 1990

[54] AUTOMOTIVE FUEL VAPORIZATION SYSTEM FOR BETTER FUEL ECONOMY AND ENVIRONMENTAL QUALITY HAVING FIRE RETARDING PROPERTIES

[76] Inventor: Burnell H. Mauller, 290 Magnolia Ave., Clarksburg, W. Va. 26301

[21] Appl. No.: 434,575

[22] Filed: Nov. 13, 1989

Related U.S. Application Data

[63] Continuation-in-part of Ser. No. 332,060, Apr. 3, 1989, abandoned.

[51] Int. Cl.⁵ ............................................. F02M 31/00
[52] U.S. Cl. ..................................................... 123/557
[58] Field of Search .......................... 123/557, 545, 547

[56] References Cited

U.S. PATENT DOCUMENTS

| | | |
|---|---|---|
| 1,222,106 | 4/1917 | Kelly . |
| 2,110,806 | 3/1938 | Malobitzky . |
| 2,702,694 | 2/1955 | Featherston . |
| 2,892,692 | 6/1959 | Anderson . |
| 3,792,688 | 2/1974 | Grainger . |
| 4,099,499 | 7/1978 | Giardini et al. ...................... 123/557 |
| 4,267,802 | 5/1981 | Garretson . |
| 4,325,345 | 4/1982 | Wilkinson et al. ................... 123/557 |
| 4,342,303 | 8/1982 | McCord ............................... 123/557 |
| 4,356,805 | 11/1982 | Kler ...................................... 123/557 |
| 4,368,163 | 1/1983 | Covey . |
| 4,398,523 | 8/1983 | Henson ................................. 123/557 |
| 4,494,516 | 1/1985 | Covey . |
| 4,498,447 | 2/1985 | Harvey ................................. 123/557 |
| 4,510,913 | 4/1985 | Decelle ................................. 123/557 |
| 4,606,320 | 8/1986 | McGee ................................. 123/557 |

Primary Examiner—Andrew M. Dolinar
Assistant Examiner—M. Macy
Attorney, Agent, or Firm—Oblon, Spivak, McClelland, Maier & Neustadt

[57] ABSTRACT

For better automotive fuel economy and environmental quality in an engine, a mixture heating chamber is attached to an engine exhaust manifold. A U-shaped air tube is connected to the mixture heating chamber for supplying heated air to the chamber. A vapor supply fuel line supplies the mixture heating chamber with liquid fuel, the liquid fuel being sprayed from the vapor supply fuel line into a portion of the U-shaped air tube located inside the mixture heating chamber resulting in the vaporization of the liquid fuel. The mixture heating chamber is partially filled with copper pads for fire retarding purposes. The interior of the mixture heating chamber is lined with a felt-liner which retains the liquid fuel present and also acts as a wick. A fuel selector switch allows fuel to be channelled through a vapor supply fuel line and into the mixture heating chamber or alternatively into a main fuel line which connects directly to the carburetor of the vehicle. An outlet tube connects to the mixture heating chamber and allows fuel vapors to travel to a carburetor adaptor located on top of the carburetor.

23 Claims, 6 Drawing Sheets

AUTOMOTIVE FUEL VAPORIZATION SYSTEM FOR BETTER FUEL ECONOMY AND ENVIRONMENTAL QUALITY HAVING FIRE RETARDING PROPERTIES

This application is a continuation-in-part of application Ser. No. 07/332,060, filed on Apr. 3, 1989, now abandoned.

FIELD OF THE INVENTION

The present invention generally relates to a system and apparatus for an automotive fuel vaporization system.

BACKGROUND OF THE INVENTION

The idea of fuel vaporization is not a new one. Examples of gasoline fuel vaporizers can be found in U.S. Pat. No. 1,222,106, U.S. Pat. No. 2,892,692, and U.S. Pat. No. 4,494,516. Problems with prior art vaporization systems include the incomplete vaporization of the liquid fuel before being introduced to the carburetor, the inability to quickly and efficiently switch from vapor fuel to liquid fuel, the difficulty of realizing instantaneous acceleration, and starting in cold-weather conditions. Of vital concern is the necessity that any vaporizing system be provided with adequate fire retarding and explosion-preventative properties. The prior art is woefully lacking in this regard. Inefficiencies in the vaporization of liquid fuel can result in a reduction in fuel economy and an augmentation of pollutant exhausts.

Consequently, a need exists for a safe and low cost fuel vaporization system which is easily adaptable to motor vehicles having a conventional gas tank, exhaust manifold and carburetor which results in better fuel economy and lower environmental pollution while at the same time maintaining or improving the vehicle's performance capabilities.

SUMMARY OF THE INVENTION

One object of the present invention is to improve fuel economy of a standard automotive engine through the use of vaporized fuel.

Another object of the present invention is a more pollution free exhaust than is realized by vehicles equipped with present day pollution control devices such as the catalytic converter.

Still another object is that the invention be provided with fire retarding and explosion-preventative properties so that safety in use is assured.

The present invention provides for a fuel vaporization apparatus which can be adapted to any carburetor system. In fact, the apparatus may be implemented in a motor vehicle having no carburetor at all.

The invention realizes exceptional fuel economy and not only controls and reduces pollutant exhausts, but does so without the need of cumbersome and fuel inefficient devices. Indeed, the invention makes possible the comfort and performance of a large automobile while realizing the fuel savings of a compact one.

In accordance with the above objectives, the present invention shall be defined as an apparatus for a motor vehicle having an exhaust manifold and liquid fuel tank which includes a metal mixture heating chamber, vapor fuel supply means for supplying the chamber with fuel to be vaporized, liquid fuel recovery means for recovering liquid fuel from the mixture heating chamber, fire retarding means for preventing fire and explosion in the mixture heating chamber, and air supply means for providing the mixture heating chamber with air.

The present invention is provided with a selector switch activated from the dashboard of the vehicle which determines whether liquid fuel is channeled directly to the carburetor or is channeled to a mixture heating chamber. The mixture heating chamber is attached to the engine manifold which transfers heat to the mixture heating chamber when the engine is operated. A fuel line directs liquid fuel into an air tube located inside the mixture heating chamber which sprays the liquid fuel into the air tube. The liquid fuel and heated air result in vapor forming in the mixture heating chamber which is extracted through an outlet tube to a carburetor adaptor fitted over the carburetor which connects to the engine intake manifold.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
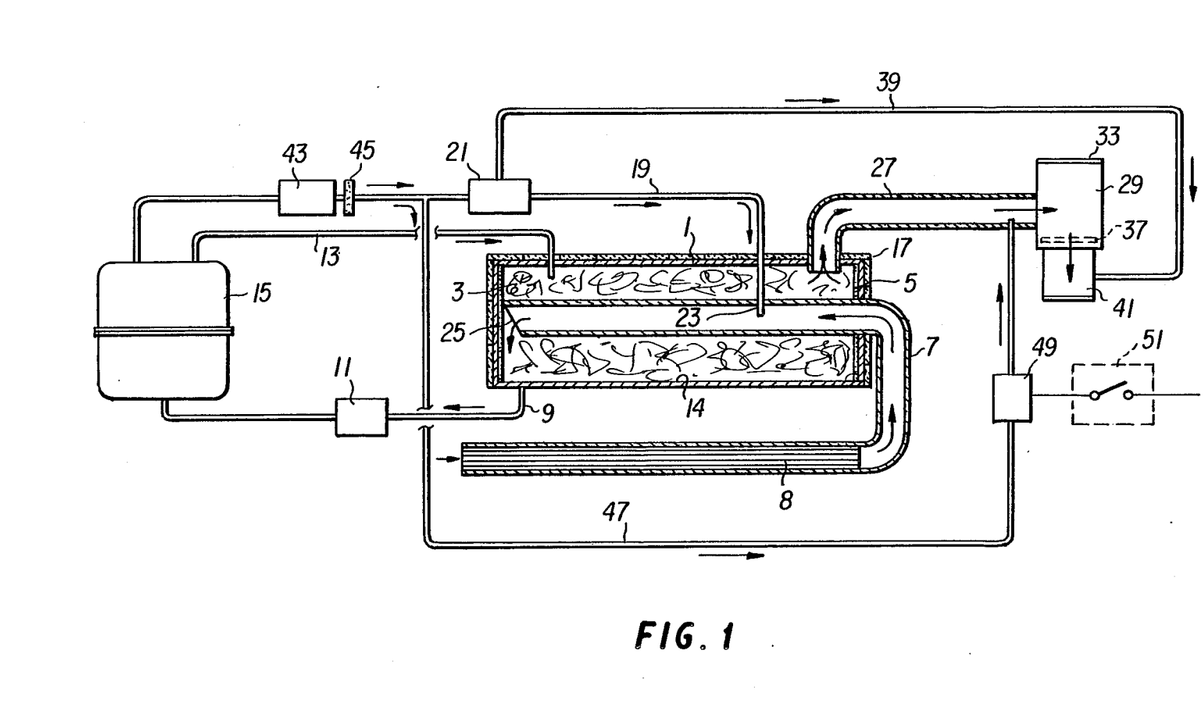
FIG. 1 is a schematic diagram of the mixture heating chamber and the elements which connect the mixture heating chamber to the main fuel tank and carburetor adaptor.
Figures 2, 3:
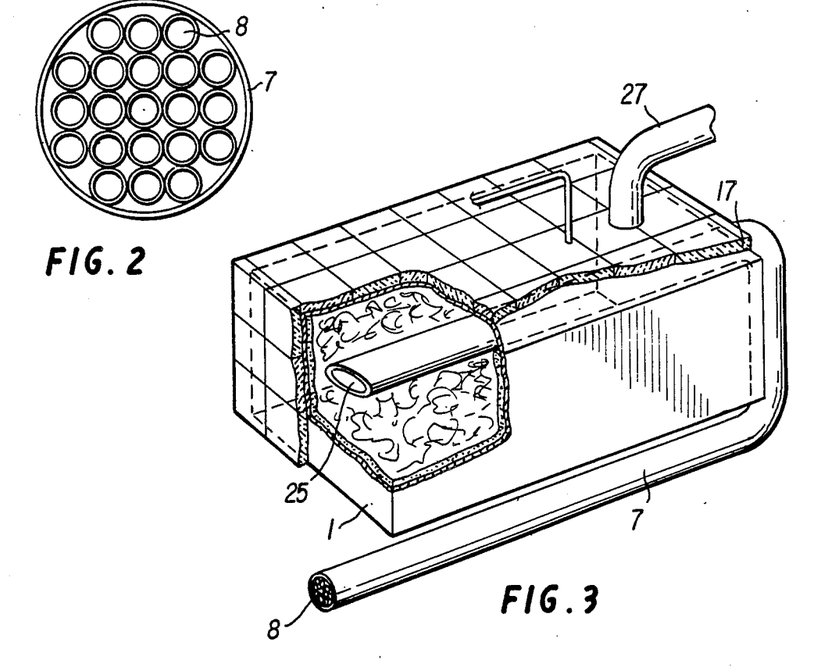
FIG. 2 is an end view illustrating the copper tubes which are present in the air tube which is connected to the mixture heating chamber.
FIG. 3 is a schematic illustration depicting the interior of the mixture heating chamber and the interconnection of the vapor supply fuel line with the air tube inside the mixture heating chamber.

Referring now to the drawings, wherein like reference numerals designate identical or corresponding parts throughout the several views, and more particularly to FIG. 1 thereof, a mixture heating chamber 1 is shown. This mixture heating chamber is a 6 inch×6 inch×12 inch steel box having a wall thickness of ¼ inch. The mixture heating chamber can be made of aluminum or other materials which have superior heat conducting properties. The heating chamber is filled with a quantity of fleece-like fibrous copper pads 3 such as the popular Brillo TM scouring pads. The interior sides and ends of the mixture heating chamber are lined with a ⅜ inch flexible wool-felt lining 5 that acts as a wick. An upper portion of a two inch U-shaped copper air tube 7 enters the mixture heating chamber and horizontally extends across the entire length of the chamber, the upper portion being located within the mixture heating chamber midway between the top of the chamber and the interior bottom 14. A bottom portion of the copper air tube 7 is mounted directly against the exhaust manifold (not shown) as is the bottom exterior of the mixture heating chamber 1. The mixture heating chamber 1 and the bottom section of air tube 7 are mounted to the exhaust manifold by means of clamps which are well-known in the automotive art. The bottom section of the air tube 7 is completely filled with 5/16 inch × 12 inch copper tubing 8 as shown in FIG. 2. The air tube 7 constitutes a primary source of air supplied to the mixture-heating chamber.

An overflow line 9 which is a 5/16 inch tube protrudes inside the bottom of the mixture heating chamber as can be seen in FIG. 1. The overflow line 9 contains a filter (not shown) which filters the excess liquid fuel, which may accumulate inside the mixture heating chamber, before the excess liquid fuel is channelled back to the main fuel tank. The overflow line is connected to an overflow fuel pump 11 which pumps this excess liquid fuel into the main fuel tank so the liquid fuel can be used again.

A second 5/16 inch copper tube which constitutes gas tank vent 13 extends from the main fuel tank 15 and enters the top of the mixture chamber. Gas tank vent 13 allows the vapors directly emanating from the gas tank to be burned along with the vaporized fuel produced in the mixture heating chamber. This design increases the vaporization efficiency of the device and allows the vehicle to be started from gasoline fumes from the fuel tank 15 during warm weather conditions. In cold weather, a motor vehicle using the present invention must be started with liquid fuel. A more detailed description of how liquid fuel and vaporized fuel are used in the invention shall be included in the discussion to follow. Since it is desirable that the mixture heating chamber preserve heat during cold weather conditions, an insulating tile 17 is provided around those outside portions of the mixture heating chamber which do not make contact with the exhaust manifold.

A third 5/16 inch copper-tube-type liquid fuel supply line 19 extends from a selector switch 21 through the top of the mixture heating chamber 1 and into the interior of the air tube 7 located inside the mixture heating chamber as shown in FIGS. 1 and 3. Liquid fuel supply line 19 is capped off inside the air tube 7 and a 1/64 inch aperture 23 is formed in the side of the fuel line 19 facing the open end 25 of the air tube 7. Liquid fuel is sprayed from the aperture to the open end 25 of air tube 7. As has been mentioned, the upper portion of the air tube 7 is located inside the mixture heating chamber and extends across the entire length of the mixture heating chamber. The heated air enters the mixture heating chamber from one side of the mixture heating chamber and flows through the mixture heating chamber to the side opposite that from which it entered. The open end 25 of air tube 7 makes contact with a side of the mixture heating chamber which is opposite to the side from which the air tube entered.

This open end 25 of the air tube 7 located inside the mixture heating chamber is cut away at a 45° angle from the side of the mixture heating chamber opposite the side from which the air tube entered. The liquid fuel is sprayed out of the 1/64 inch aperture in the fuel line 19 and directed towards the opening of the air tube 7 located inside the mixture heating chamber, the 1/64 inch aperture being at a distance approximately ¾ of the length of the mixture heating chamber from the angled air tube open end 25.

The mixture heating chamber is filled with the copper pads 3 such that approximately 1 inch of space is left at the top of the mixture heating chamber when the pads are in an uncompressed state Copper pads are also inserted inside the upper portion of the air tube 7 from the angled open end of the air tube and extend approximately 1½ inches into the opening. These copper pads have been found give the invention superior fire-retarding and explosion-preventing qualities.

A 1½ inch copper outlet tube 27 connects to the top of the mixture heating chamber at one end and to a carburetor adaptor 29 at the other end so that the vaporized fuel can be channeled to the carburetor adaptor. The carburetor adaptor 29 comprises a cylinder air-tightly fitted to the air breather opening of a carburetor 41, and has three one-inch diameter holes 31 located on its top. When a motor vehicle runs on vapors, these holes (see FIG. 4) are closed by means of a round plate 33 which may be rotated by control wire 35 similar to a choke wire or throttle wire on a lawn mower. This control wire 35 is activated by a handle located on the dash of the motor vehicle. A cloth air filter 37 is located inside the carburetor adaptor which filters air originating from the carburetor adaptor air holes and/or the outlet tube.

Controls located on the dash of the motor vehicle activate the selector switch 21. Selector switch 21 is an electrically controlled 3-way valve and can direct liquid fuel, which has traveled from the main fuel tank 15 through fuel pump 43 and fuel filter 45, to fuel line 19 or the main fuel line 39 which leads the liquid fuel directly to the carburetor 41. A 5/16 inch copper tube bypass fuel line 47 receives filtered liquid fuel from the fuel filter 45 and channels this liquid fuel to an acceleration switch 49.

The significance of the acceleration switch shall be explained presently.

Experimentation has demonstrated that acceleration when using vapors was identical to burning liquid fuel except for instances when quick, instantaneous acceleration was desired. For example, it was found when a driver floored the gas pedal or came within a ½ inch or so of flooring the gas pedal that no corresponding increase in speed was manifested. In short, the speed of the automobile would plateau and would not increase if the accelerator pedal was placed to the floor while the vehicle was being operated on vapors. To correct this plateauing of speed, the automatic acceleration switch 49 connects to the bypass fuel line 47. The automatic acceleration switch is controlled by the acceleration relay switch 51 which is operated on 12 volts DC as is selector switch 21. When the gas pedal is ½ inch from the floor of the automobile, the throttle bar (not shown) throws the relay switch 51 so that acceleration switch 49 opens.

Fuel is then directed through acceleration switch 49 and into a 5/16 inch copper fuel line which connects to the end of outlet tube 27 which connects to carburetor adaptor 29. Thus, when an operator of a vehicle floors the gas pedal while the vehicle is being operated on vapor fuel, a burst of liquid fuel will be injected into the outlet tube 27 so that the carburetor receives a mixture of liquid fuel and vapor. This sudden burst of vapor and liquid fuel results in a burst of speed which is analogous to a passing gear. When a driver's foot relaxes so the acceleration pedal is more than ½ inch above the floor of the vehicle, the relay switch 51 automatically closes the acceleration switch 49 and the motor vehicle is returned to operating on fuel vapors entirely.

Figure 5:
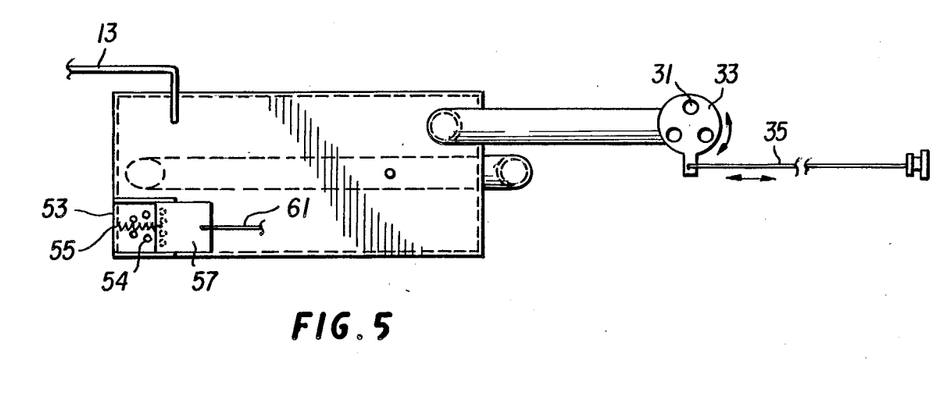
FIG. 5 illustrates a top view of the mixture heating chamber and carburetor adaptor and depicts the air holes present in both of these devices.

Air is introduced into the mixture heating chamber by two routes. The air tube 7 has been previously discussed. A supplemental air supply 53 which constitutes a V-shaped series of ¼ inch holes 54 drilled in the top of the mixture heating chamber 1 supplies another source of air as shown in FIG. 5. These V-shaped holes are spaced approximately ⅛ inch apart and cover a 2 inch×2 inch area. A sliding steel plate 57 covers these holes with one end of the plate being attached to a taut spring 55 which holds the plate in place when the holes are closed. Due to the V shape of the holes, greater amounts of air are supplied to the mixture heating chamber as the steel plate 57 is drawn back. The other end of steel plate 57 is attached to a small cable 61 that is rigged through a system of simple pulleys to the existing accelerator cable (not shown). As the driver accelerates while running on vapor, the accelerator cable opens the sliding plate and draws more air into the chamber.

Since the vehicle will normally be operated on gasoline vapors, as this method is much more efficient, it should be noted that the mixture heating chamber is a superb air filter which requires no external air filter.

Figure 4:
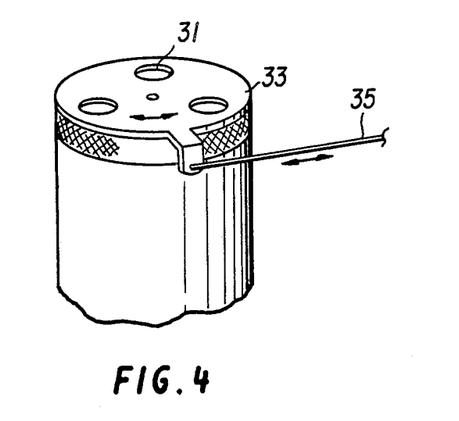
FIG. 4 is a schematic of the carburetor adaptor.

However, the carburetor adaptor is provided with a cloth air filter 37 which provides further filtering of vapor coming from the outlet tube 27 when the vehicle is run on vapors and provides filtering of air originating from the carburetor adaptor's air holes 31 when the vehicle is run on liquid fuel.

To use the presently described invention, a motor vehicle operator during cold weather conditions activates the selector switch 21 from the control panel of the vehicle so that liquid fuel is channelled directly to the carburetor. The operator would also engage the control wire 35 so as to open the air holes located on top of the carburetor adaptor, and the vehicle is run on liquid fuel. After the engine has heated sufficiently the operator of the vehicle can activate the selector switch 21 so that liquid fuel is channelled through the vapor supply fuel line to the mixture heating chamber, the operator also closing the air holes located on top of the carburetor adaptor at this time.

During warm weather conditions, the vehicle can be started and operated on vapor fuels entirely. The mixture heating chamber and the lower portion of air tube 7 being attached to the exhaust manifold of the engine, the air channelled through the air tube 7 to the mixture heating chamber becomes heated and the liquid fuel sprayed into the air tube becomes a vaporized fuel which rises to the top of the mixture heating chamber and is extracted through the outlet tube 27 into the carburetor adaptor through the carburetor and into the engine intake manifold. The gas tank vent 13 which connects the top of the gas tank to the top of the mixture heating chamber supplies the mixture heating chamber with any vapors which might be present in the gas tank. Located at the bottom of the mixture heating chamber is the overflow line 9 which connects to the overflow fuel pump 11 which extracts any excess liquid fuel located at the bottom of the mixture heating chamber. The felt lining located in the mixture heating chamber also helps to trap liquid fuel so that only a vapor is extracted through the outlet tube 27.

Should the driver desire quick acceleration and floor the accelerator pedal, the accelerator relay switch 51 will activate the automatic acceleration switch 49 so that liquid fuel is allowed to travel from the bypass fuel line 47 through the selector switch 49 and into the outlet tube 27 to combine vapor and liquid fuel in the carburetor adaptor 29 which results in quick acceleration. As the driver lowers the accelerator pedal to the floor, an accelerator cable opens the sliding plate 57 to allow more air to be received by the mixture heating chamber by means of the supplemental air supply 53 located on top of the chamber.

Figure 6:
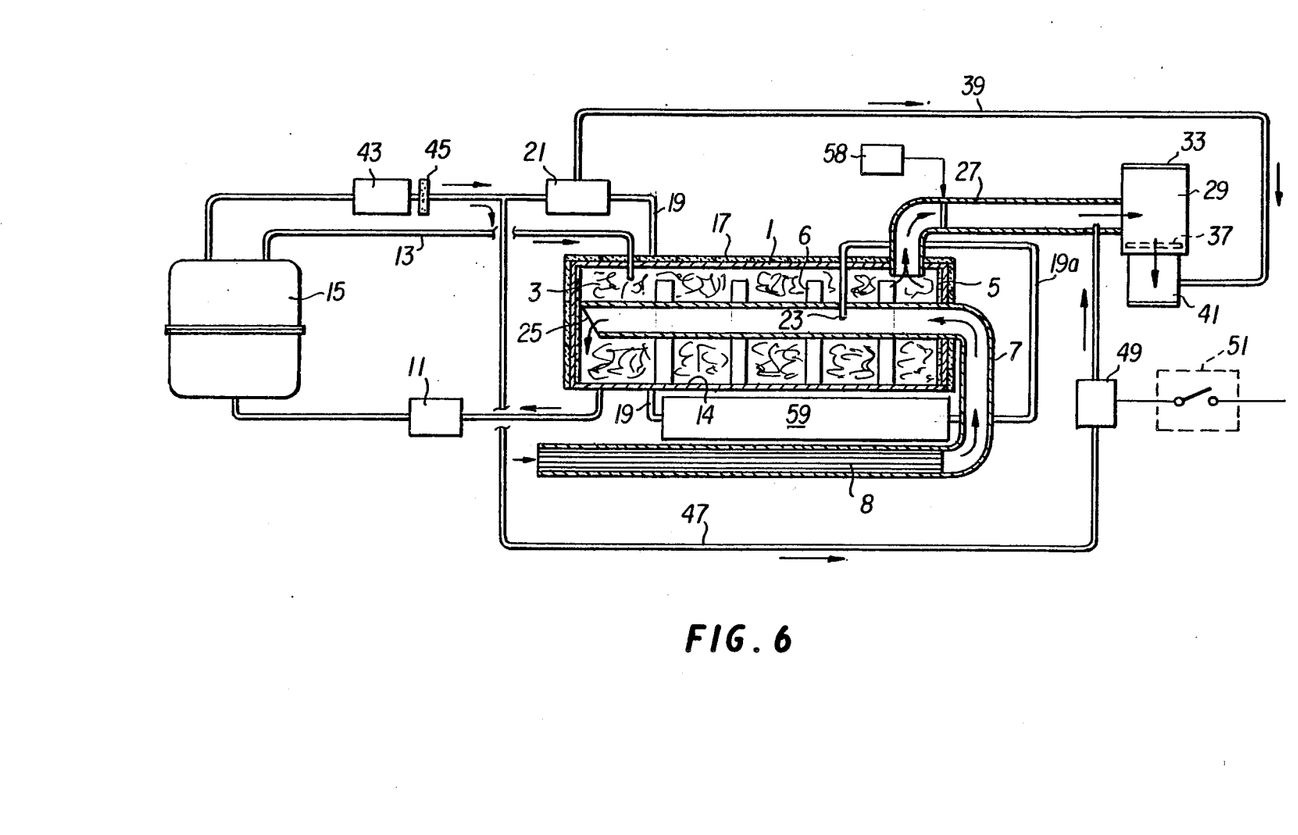
FIG. 6 is a schematic diagram similar to that of FIG. 1 with a butterfly valve, felt dividers and a fuel preheating apparatus being further included.
Figure 8:
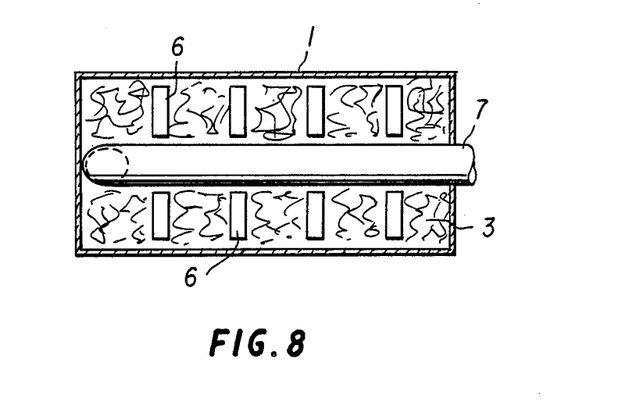
FIG. 8 is a top view of the mixture heating chamber with the top of the chamber removed for purposes of demonstrating the arrangement of the felt dividers.

FIG. 6 of the drawings demonstrates a preferred embodiment of the present invention wherein felt dividers are seen as being placed between the copper pads 3. The felt dividers 6 extend vertically upward from the bottom of the mixture heating chamber to just above the top vertical level of the copper pads 3 and act as a wick. As shown in FIG. 8, the felt dividers are located on both sides of that portion of the U-shaped tube 7 which lies inside the mixture heating chamber. FIG. 8 depicts eight felt dividers with four dividers being located on each side of the U-shaped tube. The felt dividers are approximately ½ inch thick and are located every 2½ inches or so along the length of the mixture heating chamber. However, the number and thickness of the felt dividers may be varied.

Figure 7A:
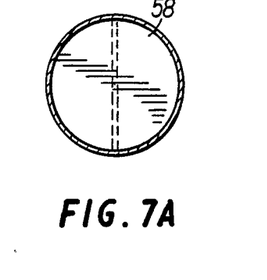
FIG. 7A shows the closed butterfly valve and FIG. 7B shows an open butterfly valve.
Figure 7B:
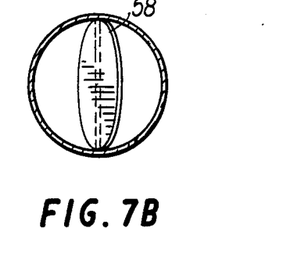

FIG. 6 further demonstrates a butterfly valve 58 which allows the fuel vapors to travel from the mixture heating chamber to the carburetor adaptor 29 by way of the outlet tube 27. Butterfly valves are well-known in the mechanical arts. Should any detectable force or pressure be applied to the butterfly valve so that a flow of air is directed from the side of the carburetor adaptor back to the mixture heating chamber, the butterfly valve closes as shown in FIG. 7A. This feature prevents backfire explosions. When the fuel vapor is being directed from the mixture heating chamber to the carburetor adaptor, the butterfly valve is completely open as shown in FIG. 7B. Thus, the metal flaps which are hinged on the center pin of the butterfly valve are either in a totally open position or a totally closed position. Stainless steel or copper porous pads (not shown) may be provided in the outlet tube 27 between the butterfly valve 58 and the carburetor adaptor for purposes of further augmenting the fire retardant properties of the invention.

Figure 9:
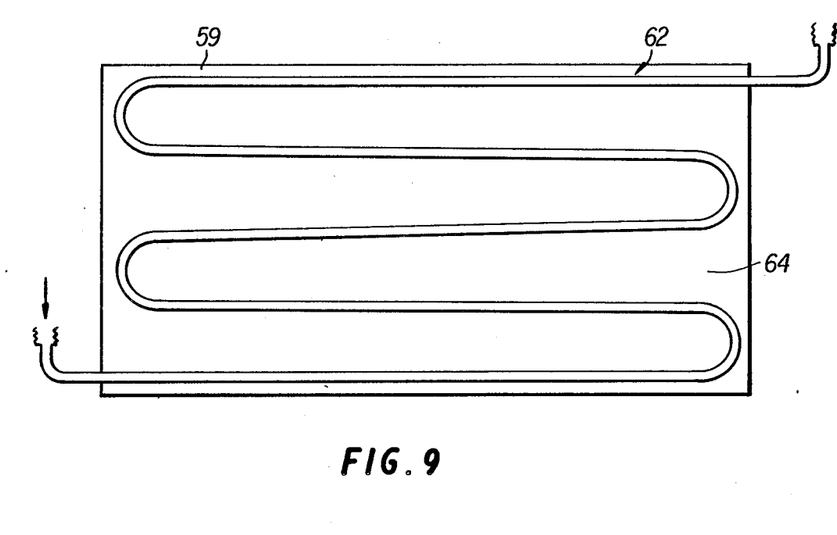
FIG. 9 is an illustration of the fuel preheating apparatus.

Furthermore, FIG. 6 shows pre-heating apparatus 59 which receives the liquid fuel from fuel supply line 19. As shown in FIG. 9, pre-heating apparatus 59 is made of ¼ inch diameter steel coil 62 which is cast into four loops upon an aluminum plate 64 measuring 10½ inches in length, five inches in width, and ½ inch in thickness. The pre-heating apparatus is placed between the exhaust manifold of the vehicle and the mixing heating chamber so that the liquid fuel is heated as it travels out of the fuel supply line 19 through steel coil 62 and out through fuel supply line 19a. Thus, the fuel when it arrives at aperture 23 is at a temperature which enhances the vaporization process. A filter (not shown) can be provided on fuel line 19a at a location above the mixture heating chamber so that the fuel is further purified before exiting at aperture 23.

The present invention has been tested on a 1968 Chrysler Newport with a 383 cubic inch V-8 engine. The Chrysler Newport before being altered with the present invention got approximately 13 miles per gallon around town. After the vehicle was altered by the presently described invention, it was highway-road tested and found to get 58 miles per gallon. The exhaust emissions of the Chrysler Newport have been tested with and without the fuel vaporization device of the present invention. Without the vaporization device, the hydrocarbon level of the Newport's emission registered 411 ppm. With the vaporization device, the hydrocarbon level was reduced to 110 ppm, a reduction of over 73%. The invention has also been tested for fire retardant and explosion-preventative qualities with no damage being discovered even when the mixture heating chamber was exposed to open flames.

Thus, the present invention can be seen to achieve a high degree of fuel economy and environmental quality which can be adapted to virtually any vehicle in a safe and effective manner.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. For a motor vehicle having an internal combustion engine, a liquid-fuel vaporizer, comprising:
   a mixture heating chamber connectable to a heating element of said motor vehicle for vaporizing a liquid fuel supplied thereto;
   fuel supply means for supplying said mixture heating chamber with liquid fuel to be vaporized;
   liquid fuel recovery means for recovering unvaporized liquid fuel from said mixture heating chamber;
   fire retarding means in said mixture heating chamber for inhibiting ignition of vaporized fuel;
   lining material, capable of being saturated with said liquid fuel, covering the interior sides of said mixture heating chamber;
   air supply means for providing said mixture heating chamber with air; and
   means for supplying the vaporized fuel to the engine of the vehicle.

2. A liquid fuel vaporizer according to claim 1, wherein:
   said liquid fuel vaporizer is positioned in the motor vehicle.

3. A liquid fuel vaporizer according to claim 2, wherein:
   said heating element is an exhaust manifold.

4. A liquid fuel vaporizer according to claim 1, wherein:
   said fire retarding means comprises fleece-like fibrous copper pads.

5. A liquid fuel vaporizer according to claim 1, wherein:
   said mixture heating chamber is made of aluminum.

6. A liquid fuel vaporizer according to claim 1, further comprising:
   heat insulation means for insulating said mixture heating chamber.

7. A liquid fuel vaporizer according to claim 1, further comprising:
   fastening means for attaching said mixture heating chamber to said heating element.

8. In a motor vehicle having an internal combustion engine, a liquid fuel vaporizer system, comprising:
   a mixture heating chamber connectable to a heating element of said motor vehicle;
   a felt lining covering the interior sides of said chamber;
   a U-shaped metal air tube, a first section of said U-shaped metal air tube being connectable to the heating element, said first section having a plurality of metal pipes therein, and a second section of said U-shaped metal air tube entering said mixture heating chamber at a first side of said chamber and the top of an open end of said second section of said U-shaped metal air tube making contact with an interior side of said mixture heating chamber opposite to said first side, said open end forming an angle with said interior side;
   a plurality of copper pads filling said mixture heating chamber and said second section of said U-shaped metal air tube to a predetermined extent;
   a gas vent tube connectable to a top portion of a liquid fuel tank and connected to the top of said mixture heating chamber;
   a liquid fuel supply line extending into the interior of said mixture heating chamber and into the second section of said U-shaped metal air tube where an end of said liquid fuel supply line is capped off, said liquid fuel supply line having an aperture directed toward said open end of said second section of said U-shaped metal tube;
   an outlet tube connected to said mixture heating chamber for channelling fuel vapor from said mixture heating chamber;
   a carburetor adaptor connectable to said outlet tube and connectable to a carburetor of said motor vehicle; and
   an overflow fuel line connected to the bottom of said mixture heating chamber.

9. A system according to claim 8, wherein:
   said heating element is an engine exhaust manifold.

10. A system according to claim 9, further comprising:
    securing means for securing said mixture heating chamber and said first section of said U-shaped metal air tube to said exhaust manifold.

11. A system according to claim 8, further comprising:
    an overflow fuel pump connectable to said overflow fuel line and connectable to said liquid fuel tank.

12. A system according to claim 8, wherein:
    a top portion of said carburetor adaptor has a plurality of air holes.

13. A system according to claim 12, further comprising:
    a rotatable plate covering and attached to the top portion of said carburetor adaptor, said rotatable plate having a plurality of holes corresponding to the plurality of holes in the top portion of said carburetor adaptor.

14. A system according to claim 13, further comprising:
    means for moving said rotatable plate.

15. A system according to claim 13, wherein:
    said carburetor adaptor includes a cloth air filter.

16. A system according to claim 8, wherein:
    a top portion of said mixture heating chamber is provided with auxiliary air holes.

17. A system according to claim 16, further comprising:
    a sliding cover for covering said auxiliary air holes, one side of said sliding cover being connected to a taut spring and an opposite side of said sliding cover being connected to a cable which is rigged through pulleys and connected to an accelerator pedal.

18. In a motor vehicle having an internal combustion engine, a liquid fuel vaporizer system, comprising:
- a mixture heating chamber connectable to a heating element of said motor vehicle, a top portion of said mixture heating chamber being provided with auxiliary air holes;
- a felt lining covering the interior sides of said chamber;
- a U-shaped metal air tube, a first section of said U-shaped metal air tube being connectable to the heating element and having a plurality of metal pipes therein, and a second section of said U-shaped metal air tube entering said mixture heating chamber at a first side of said chamber and the top of an open end of said second section of said U-shaped metal air tube making contact with an interior side of said mixture heating chamber opposite to said first side, said open end forming an angle with said interior side;
- a plurality of copper pads filling said mixture heating chamber and said second section of said U-shaped metal air tube to a predetermined extent;
- a gas vent tube, connectable to a top portion of a liquid fuel tank, connected to the top of said mixture heating chamber;
- a liquid fuel supply line extended into the interior of said mixture heating chamber and into the second section of said U-shaped metal air tube where an end of said liquid fuel supply line is capped off, said liquid fuel supply line having an aperture directed toward said open end of said second section of said U-shaped metal tube;
- an outlet tube connected to said mixture heating chamber for channeling fuel vapor;
- a sliding cover connected to the top portion of said mixture heating chamber having means for exposing said auxiliary air holes;
- a carburetor adaptor connected to said outlet tube and connectable to a carburetor of said motor vehicle;
- a bypass fuel line connectable to said main gas tank;
- an automatic acceleration switch connected to said bypass fuel line for selectively allowing liquid fuel in said bypass fuel line to be introduced into said outlet tube;
- a selector switch, connectable to a main fuel line which is connected to said carburetor of said vehicle, for alternately introducing liquid fuel from said liquid fuel tank into said main fuel line and said liquid fuel supply line;
- an overflow fuel line connected to the bottom of said mixture heating chamber; and
- an overflow fuel pump connected to said overflow fuel line, said overflow fuel pump being connected to said liquid fuel tank.

19. A system according to claim 18, further comprising:
- an acceleration relay switch for controlling said automatic acceleration switch.

20. A system according to claim 18, further comprising:
- means for controlling said selector switch.

21. A liquid-fuel vaporizer according to claim 1, wherein:
- said fuel supply means comprises a pre-heating apparatus comprised of a steel coil cast upon an aluminum plate.

22. A liquid-fuel vaporizer according to claim 4, further comprising:
- felt dividers intermittently placed between the copper pads in the mixture heating chamber, said felt dividers acting as a wick.

23. A liquid fuel vaporizer according to claim 1, wherein:
- said vaporized fuel supplying means comprises an outlet tube equipped with a butterfly valve.

* * * * *